US011057124B2

(12) United States Patent
Kato et al.

(10) Patent No.: US 11,057,124 B2
(45) Date of Patent: Jul. 6, 2021

(54) WIRELESS COMMUNICATION SYSTEM, WIRELESS COMMUNICATION APPARATUS AND DIRECTIVITY DETERMINATION METHOD

(71) Applicant: PANASONIC INTELLECTUAL PROPERTY MANAGEMENT CO., LTD., Osaka (JP)

(72) Inventors: Osamu Kato, Fukuoka (JP); Hiroaki Asano, Kanagawa (JP); Hideki Kanemoto, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/551,090

(22) Filed: Aug. 26, 2019

(65) Prior Publication Data

US 2020/0067609 A1 Feb. 27, 2020

(30) Foreign Application Priority Data

Aug. 27, 2018 (JP) .............................. JP2018-158211

(51) Int. Cl.
| | | |
|---|---|---|
| *H04B 17/14* | (2015.01) | |
| *H04B 17/318* | (2015.01) | |
| *H04B 17/10* | (2015.01) | |

(52) U.S. Cl.
CPC ........... *H04B 17/14* (2015.01); *H04B 17/104* (2015.01); *H04B 17/318* (2015.01)

(58) Field of Classification Search
CPC .... H04B 17/14; H04B 17/318; H04B 17/104; H04B 7/0695
See application file for complete search history.

(56) References Cited

U.S. PATENT DOCUMENTS

2013/0231059 A1* 9/2013 Prasad ................. H04B 7/0408
455/63.4
2017/0134964 A1* 5/2017 Yu .......................... H04L 5/005

OTHER PUBLICATIONS

Ehab Mahmoud Mohamed et al., "Millimeter Wave Beamforming Based on WiFi Fingerprinting in Indoor Environment," *Graduate School of Engineering, Osaka University, Electrical Engineering Dept., Aswan University*, 2015 IEEE International Conference on Communication Workshop (ICCW), Jun. 2015, 6 pages.

* cited by examiner

*Primary Examiner* — Yuwen Pan
*Assistant Examiner* — Fatuma G Sherif
(74) *Attorney, Agent, or Firm* — Seed IP Law Group LLP

(57) ABSTRACT

A wireless receiver measures a reception parameter while scanning multiple pieces of reception directivity for an interval during which a signal is not transmitted from a wireless transmitter. The wireless transmitter transmits a signal while scanning multiple pieces of transmission directivity, and the wireless receives measures a reception parameter relating to reception of the signal and determines k pieces of transmission directivity that correspond to high-ranking k results, respectively, of the measurement that have a great reception parameter. The wireless transmitter forms any transmission directivity and transmits a signal, and the wireless receives measures a reception parameter while scanning M pieces of reception directivity and determines reception directivity that is to be used for data communication.

9 Claims, 11 Drawing Sheets

| M | SINR |
|---|---|
| 1 | ... |
| 2 | ... |
| ⋮ | ⋮ |
| 64 | ... |

T2

| | M | RECEIVED POWER LEVEL(R1) |
|---|---|---|
| WITHOUT RADIO-FREQUENCY RADIATION | 1 | ... |
| | 2 | ... |
| | ⋮ | ⋮ |
| | 64 | ... |

| | L | RECEIVED POWER LEVEL |
|---|---|---|
| OMNI-DIRECTIONAL RECEPTION | 1 | ... |
| | 2 | ... |
| | ⋮ | ⋮ |
| | 64 | ... |

FIG.9

| | R | RECEIVED POWER LEVEL (R2) |
|---|---|---|
| i | 1 | ... |
| | 2 | ... |
| | ⋮ | ⋮ |
| | 64 | ... |

| | R | SINR |
|---|---|---|
| i | 1 | ... |
| | 2 | ... |
| | ⋮ | ⋮ |
| | 64 | ... |

T6

WIRELESS COMMUNICATION SYSTEM, WIRELESS COMMUNICATION APPARATUS AND DIRECTIVITY DETERMINATION METHOD

BACKGROUND OF INVENTION

1. Field of the Invention

The present disclosure relates to a wireless communication system, a wireless communication apparatus and a directivity determination method that determine directivity relating to transmission and reception by wireless communication apparatuses that use a high frequency.

2. Description of the Related Art

In a high frequency band (for example, a Super High Frequency (SHF) band of 6 to 30 GHz or an Extremely High Frequency (EHF) band of 30 to 300 GHz) (the same is hereinafter true), which is considered as being allocated to the 5-th generation mobile communication system (5G), because a radio wave propagation loss is great, distances of propagation by wireless communication apparatus are limited to being short. The usual practice for alleviating this restraint is to apply a beamforming technology in which directivity of a radio wave is involved in transmission, reception, or transmission and reception (namely, a technology of forming directivity relating to transmission beamforming (BF), reception BF or transmission and reception BF). Accordingly, it is expected to reliably secure a link budget for transmission and reception (namely, an allowable radio wave propagation loss along a path between a transmission point and a reception point) between each of the wireless communication apparatus.

For example, in Non-Patent Literature 1, it is disclosed that the following technique in the related art is performed between a wireless transmitter and a wireless receiver in order to form the directivity relating to the transmission reception BF.

Specifically, in a first step, the wireless transmitter transmits a signal while scanning multiple pieces of directivity in transmission (namely, transmission directivity) in a short time. The wireless receiver performs omnidirectional reception (namely, performs reception in a non-directional manner), and for reporting, determines the transmission directivity having the highest received power level.

Next, in a second step, the wireless transmitter forms the reported transmission directivity and transmits a signal. The wireless receiver receives the signal while scanning multiple pieces of directivity (namely, reception directivity) in a short time. The wireless receiver determines the reception directivity having the highest received power level.

Next, in a third step, the wireless transmitter and the wireless receiver form the determined transmission directivity and reception directivity, respectively, and performs data transmission and data reception, respectively.

Non-Patent Literature 1: Ehab Mahmoud Mohamed, et. al., 'Millimeter Wave Beamforming Based on WiFi Fingerprinting in Indoor Environment', 2015 IEEE International Conference on Communication Workshop (ICCW), June 2015

SUMMARY OF INVENTION

With a technology of establishing a wireless link (namely, a path for wireless communication between the transmission point and the reception point) for which the first to third steps described above are performed, maximization of a signal component (signal) in reception is achieved. Therefore, in a case where only one link is present, because the link budget for this link is reliably secured, it is possible that an increase in transfer distance is achieved.

However, in a case where multiple wireless links are present with high density in the vicinity and where a wireless link is established using the same frequency as a carrier frequency, such as a frequency of the millimeter wave described above, in some cases, a signal component in any other wireless link is received as an interference component (interference). For this reason, in the technique in the related art, which involves the first and third steps described above, although the directivity relating to the transmission and reception BF that uses a maximum of a signal component which is received in a currently-in-use wireless link is determined, there is a problem in that the determined directivity relating to the transmission and reception BF cannot necessarily ensure satisfactory communication quality in the currently-in-use wireless link.

A specific example of the problem in the technique in the related art, which is described above, is described here with reference to FIG. 14. FIG. 14 is a diagram for describing the problem in the related art.

As illustrated in FIG. 14, a total of 6 apparatuses, wireless transmitters TXz1, TXz2, and TXz3, and wireless receivers RXz1, RXz2, and RXz3, are positioned a short distance apart from each other. The wireless transmitter TXz1 and the wireless receiver RXz1 determine and form transmission directivity TXBFz1 and reception directivity RXBFz1, respectively, that uses the technique in the related art, which involves the first to third steps described, and performs transmission and reception, respectively, of data. In the same manner, the wireless transmitter TXz2 and the wireless receiver RXz2 determine and form transmission directivity TXBFz2 and reception directivity RXBFz2, respectively, that uses the technique in the related art, which involves the first to third steps described, and performs transmission and reception, respectively, of data. In the same manner, the wireless transmitter TXz3 and the wireless receiver RXz3 determine and form transmission directivity TXBFz3 and reception directivity RXBFz3, respectively, that uses the technique in the related art, which involves the first to third steps described, and performs transmission and reception, respectively, of data.

Nevertheless, a signal component that is transmitted from the wireless transmitter TXz3 to the wireless receiver RXz3 is an interference component for the wireless receiver RXz1. In other words, in a state where the transmission directivity TXBFz3 is formed, when a signal is transmitted from the wireless transmitter TXz3, reception is also performed in the wireless receiver RXz3, and, because any other wireless receiver (for example, the wireless receiver RXz1) that is positioned close to the wireless receiver RXz3 forms the reception directivity RXBFz1, reception is performed at the other wireless receiver RXz1. The wireless receiver RXz1 receive a signal from the wireless transmitter TXz1 that forms the same wireless link, as a signal component, and receives a signal from the wireless transmitter TXz3 in any other wireless link, as an interference signal.

For this reason, when determining the directivity in a wireless link between the wireless transmitter TXz3 and the wireless receiver RXz3, if an influence of any other wireless link (for example, a wireless link between the wireless transmitter TXz1 and the wireless receiver RXz1) that is positioned physically a short distance apart is not taken into account, a received power level of the interference signal increases for the wireless receiver RXz1, and suitable directivity is difficult to form.

An object of the present disclosure is to provide a wireless communication system, a wireless communication apparatus and a directivity determination method that, in a case where multiple different wireless links that use the same frequency in a high frequency band are present in the vicinity, are also capable of adaptively determining the directivity relating to transmission and reception on the transmitting side and the receiving side in each of the wireless links, of reducing an influence from any other wireless link to below an allowable, and thus of suppressing a deterioration in communication quality.

According to an aspect of the present disclosure, there is provided a wireless communication system including: a wireless transmitter and a wireless receiver being connected communicatively, wherein the wireless receiver measures a reception parameter while scanning M pieces of reception directivity for an interval during which a signal is not transmitted from the wireless transmitter, where M is an integer that is equal to or greater than 2, and retains a first result of the measurement, wherein the wireless transmitter transmits a signal to the wireless receiver while scanning L pieces of transmission directivity, where L is an integer that is equal to or greater than 2, wherein the wireless receiver measures a reception parameter relating to reception of the signal that is transmitted at each of the L pieces of transmission directivity, determines k pieces of transmission directivity that correspond to high-ranking k results, respectively, of the measurement that have a great reception parameter, and reports the determined k pieces of transmission directivity to the wireless transmitter, where k is a predetermined integer value <L, wherein the wireless transmitter forms any one of the k pieces of transmission directivity and transmits a signal to the wireless receiver, and wherein the wireless receiver measures a reception parameter relating to reception of the signal that is transmitted by the wireless transmitter, while scanning the M pieces of reception directivity, and retains a second result of the measurement, and determines reception directivity that is to be used for data communication, from among the M pieces of reception directivity, based on the first result of the measurement and the second result of the measurement.

Furthermore, according to another aspect of the present disclosure, there is provided a wireless communication apparatus that is communicatively connected to a wireless transmitter, the wireless communication apparatus including: a reception antenna unit that receives a signal which is transmitted from the wireless transmitter; a memory storing instructions; and a processor configured to implement the instructions and execute a plurality of tasks, including: a setting task that sets M pieces of reception directivity in the reception antenna unit in a manner that is scannable, where M is an integer that is equal to or greater than 2; a measurement task that measures a reception parameter at each of the M pieces of reception directivity for an interval during which a signal is not transmitted from the wireless transmitter; a storing task that stores a first result of the measurement of the reception parameter into the memory; and a reception control task that determines k pieces of transmission directivity which correspond to high-ranking k results, respectively, of the measurement that have a great reception parameter, based on a result of measurement of a reception parameter relating to reception of a signal that is transmitted while scanning L pieces of transmission directivity from the wireless transmitter, where k is a predetermined integer value and L is an integer that is equal to or greater than 2, wherein the measurement task measures a reception parameter relating to reception of a signal that is transmitted at any one of the k pieces of transmission directivity from the wireless transmitter while the M pieces of reception directivity are scanned, and stores a second result of the measurement of the reception parameter in the memory, and wherein the reception control task determines reception directivity that is to be used for data communication, from among the M pieces of reception directivity, based on the first result of the measurement and the second result of the measurement.

Furthermore, according to still another aspect of the present disclosure, there is provided a directivity determination method in a wireless communication system in which a wireless transmitter and a wireless receiver are connected communicatively, the directivity determination method including: by the wireless receiver, measuring a reception parameter while scanning M pieces of reception directivity for an interval during which a signal is not transmitted from the wireless transmitter, where M is an integer that is equal to or greater than 2, and retaining a first result of the measurement; by the wireless transmitter, transmitting a signal to the wireless receiver while scanning L pieces of transmission directivity, where L is an integer that is equal to or greater than 2; by the wireless receiver, measuring a reception parameter relating to reception of the signal that is transmitted at each of the L pieces of transmission directivity, determining k pieces of transmission directivity that correspond to high-ranking k results, respectively, of the measurement that have a great reception parameter, where k is a predetermined integer value <L, and reporting the determined k pieces of transmission directivity to the wireless transmitter; by the wireless transmitter, forming any one of the k pieces of transmission directivity and transmitting a signal to the wireless receiver; by the wireless receiver, measuring a reception parameter relating to reception of the signal that is transmitted by the wireless transmitter, while scanning the M pieces of reception directivity, and retaining a second result of the measurement; and determining reception directivity that is used for data communication, from among the M pieces of reception directivity, based on the first result of the measurement and the second result of the measurement.

According to the present disclosure, in a case where multiple different links that use the same frequency in a high frequency band are positioned in the vicinity, directivity relating to transmission and reception on the transmitting side and the receiving side in each of the wireless link can be adaptively determined, and an influence of interference from any other wireless link can be reduced to below an allowable level, thereby suppressing a deterioration in communication quality.

BRIEF DESCRIPTION OF DRAWINGS

FIG. 9 is a table showing a result of measurement of a received power level for i (=1 to k), which corresponds to the scan of the reception directivity.

FIG. 10 is a table showing a result of calculation of an SINR for i (=1 to k), which corresponds to the scan of the reception directivity.

DESCRIPTION OF EMBODIMENTS

A wireless communication system, a wireless communication apparatus and a directivity determination method according to an embodiment, which are disclosed in the present disclosure, will be described in detail below in terms of configuration and operation with appropriate reference to the accompanying drawings. However, in some cases, a description that is more detailed than is necessary is omitted. For example, in some cases, a detailed description of an already-known matter is omitted, or a redundant description of substantially the same configuration is not repeated. The reason for this is to avoid unnecessary redundancy of the following description and to help a person of ordinary skill in the art to achieve easy understanding. It is noted that the accompanying drawings and the following description are provided in order for a person of ordinary skill in the art to get a sufficient understanding of the present disclosure, and therefore that this is not intended to impose a limitation on a subject matter that is recited in a claim.

Figure 1:
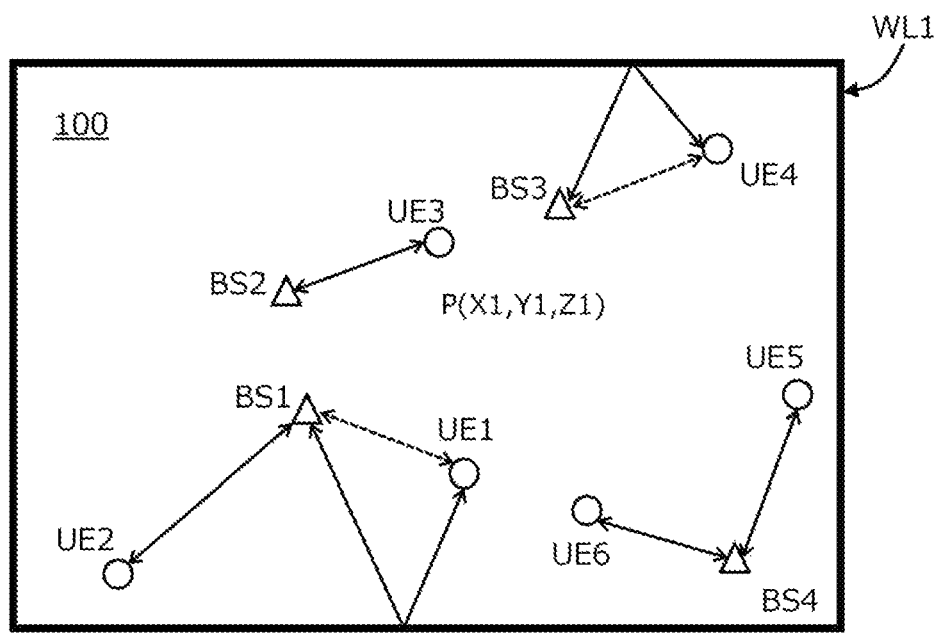
FIG. 1 is a schematic diagram illustrating an example of a layout of a within-factory area where a wireless communication system according to Embodiment 1 is installed.

FIG. 1 is a schematic diagram illustrating an example of a layout of a within-factory area WL1 where a wireless communication system 100 according to Embodiment 1 is installed. According to Embodiment 1, the wireless communication system 100 is described as being positioned within a communication area that is a physically narrow site, such as the within-factory area WL1, but, if positioned within the communication area described above, is not limited to the within-factory area WL1. It is noted that the communication area may be a place (for example, a factory, an intersection, a construction site, a stadium, such as a baseball field or a soccer field, and a main conference hall, such as an international conference room) that has such a space volume that a fixed number of base stations are installable.

The wireless communication system 100 includes multiple communication terminals UE1, UE2, UE3, UE4, UE5, and UE6, and base stations BS1, BS2, BS3, and BS4. The multiple communication terminals UE1 to UE6 and the base stations BS1 to BS4 are arranged with high density at a position that is comparatively close to (in the vicinity of) the within-factory area WL1.

The communication terminals UE1 to UE6 adaptively make a connection to any one of the base stations BS1 to BS4 through a wireless communication circuit according to their respective positions (for example, coordinates (X1, Y1, Z1)).

The wireless communication system 100 configures a network over which the communication terminals UE1 to UE6 and the base stations BS1 to BS4 possibly perform wireless communication in compliance with the same wireless standard scheme. Each of the communication terminals UE1 to UE6, if it succeeds in making an attempt for communication with any one of the base stations BS1 to BS4, starts wireless communication with that base station.

As the wireless communication scheme that is used for wireless communication in the wireless communication system 100, a band of 28 GHz whose use in a high frequency band (for example, the 5-th generation mobile station system (5G)) has been under study, a millimeter wave (namely, in a band of 30 GHz to 300 GHz) will be described exemplarily below. Namely, a wireless communication standard (for example, WiGig (a registered trademark)) in which wireless communication apparatuses are limited to a short propagation distance because a radio wave propagation loss is large is illustrated exemplarily.

As illustrated in FIG. 1, the communication terminals UE1 and UE2, as examples of a wireless transmitter, perform wireless transmission with the base station BS1 as an example of a wireless receiver. In other words, the communication terminal UE1 and the base station BS1 form one wireless line, and in the same manner, the communication terminal UE2 and the base station BS1 form another wireless link.

Furthermore, the communication terminal UE3, as an example of the wireless transmitter, performs wireless transmission with the base station BS2, as an example of the wireless receiver. In other words, the communication terminal UE3 and the base station BS2 form one wireless link.

Furthermore, the communication terminal UE4, as an example of the wireless transmitter, performs wireless transmitter with the base station BS3, as an example of the wireless receiver. In other words, the communication terminal UE4 and the base station BS3 form one wireless link.

Furthermore, the communication terminals UE5 and UE6, as examples of the wireless transmitter, perform wireless transmitter with the base station BS4, as an example of the wireless receiver. In other words, the communication terminal UE5 and the base station BS4 form one wireless line, and in the same manner, the communication terminal UE6 and the base station BS4 form another wireless link.

In the wireless communication system 100 according to Embodiment 1, multiple wireless links are formed with high density within a comparatively narrow site (a narrow area). In a method (refer to a technique in the related art) that determines transmission directivity and reception directivity in such a manner as to maximize a received-power level of a signal component (a signal), there is a likelihood that an interference component will also be received from any other wireless links that are arranged with high density in the vicinity, and in this case, a probability increases that a Signal to Interference plus Noise Ratio (SINR) in a wireless link will remain low in a currently-in-use wireless link.

For example, in FIG. 1, in a wireless link between the communication terminal UE1 and the base station BS1, when the transmission directivity and the reception directivity along a communication path for a direct wave (refer to a dashed line) are selected, strong interference occurs in a wireless link between the communication terminal UE6 and the base station BS4. This is because a signal that is transmitted from the base station BS4 toward the communication terminal UE6 is received as an interference signal in the base station BS1 and thus an SINR in the base station BS1 decreases.

In the same manner, in communication terminal UE4 and the base station BS3, when the transmission directivity and the reception directivity along the communication path for the direct wave (refer to the dashed line) are selected, strong interference occurs in a wireless link between the communication terminal UE3 and the base station BS2. This is because a signal that is transmitted from the communication terminals UE4 toward the base station BS3 is received as an interference signal in the base station BS2 and thus an SINR in the base station BS2 decreases.

In this manner, when multiple wireless links are formed with high density in a communication area (for example, the within-factory area WL1) that is a physically narrow site (refer to FIG. 1), in a technique in the related art, in which the transmission directivity and the reception directivity are determined in such a manner that a reception signal level is maximized, an influence of a signal (namely, an interference signal to a currently-in-use wireless link) from any other wireless link is exerted, and thus the transmission directivity and the reception directivity can be adaptively determined, thereby making satisfactory wireless communication difficult.

Thus, with the wireless communication system 100 according to Embodiment 1, in the within-factory area WL1 that is illustrated in FIG. 1, the transmission directivity and the reception directivity are determined in such a manner that an SINR in an individual wireless link is maximized taking into account the presence of a wall or a ceiling as well. Because of this, the transmission directivity and the reception directivity are determined in such a manner that a communication path which employs a reflection path that includes a wall or a ceiling, rather than the communication path for the direct wave. Accordingly, in each of the wireless links, the transmission directivity and the reception directivity are formed in such a manner that an influence of an interference component from any other wireless link is suppressed and thus that an SINR is maximized. Because of this, satisfactory communication is possible.

The network that is configured by the wireless communication system 100 may not be a C/U separation type network and may be the C/U separation type network. In Embodiment 1, a network that is not of the C/U separation type is described exemplarily. Namely, in the wireless communication system 100, communication of control data and communication of user data are performed by the same base station.

The base stations BS1 to BS4 each are small cell base stations that possibly provide high throughput that is based on the band of 28 GHz or the millimeter wave band, which are described above, and are installed with high density (refer to FIG. 1). The communication terminals UE1 to UE6 each communicate the control data and communicate the user data with any one of the base stations BS1 and BS4. The control data includes data relating to Control (C)-Plane. The user data include data relating to User (U)-Plane. Examples of the user data can include image data (for example, a moving image or a still image), and audio data, and can include data having a large amount of data.

The C-Plane is a communication protocol for communicating the control data for a call connection and radio resource allocation in wireless communication. The U-Plane is a communication protocol for actually performing communication (for example, video communication, voice communication, or data communication) between the communication terminal and the base station using the allocated radio resource.

A cell radius of each of the base station BS1 and BS4, for example, is 10 m to 50 m, and is comparatively small compared with a macro cell. Radio access technologies that are employable by the base stations BS1 and BS4 are various and many types of them may be present. A range where each of the base stations possibly performs the communication, for example, is determined according to a position of and the cell radius of the base station. Ranges where all base station BS1 to BS4 possibly perform the communication may have the same area and may have different areas.

The communication terminals UE1 to UE6 and the base stations BS1 to BS4 may be compatible with wireless access technologies (for example, a wireless communication standard and a wireless frequency), respectively, that are employable by them, but in some cases, a feature of the wireless communication standard in the present foreclosure and an effect that is based on the feature are achieved by a wireless communication standard in which wireless links use the same frequency bandwidth and in which beamforming is applied. For this reason, in the following description, the wireless access technology is described, taking an example the 5-th mobile communication scheme (5G) in which is assumed that transmission beamforming and reception beamforming are applied together.

Figure 2:
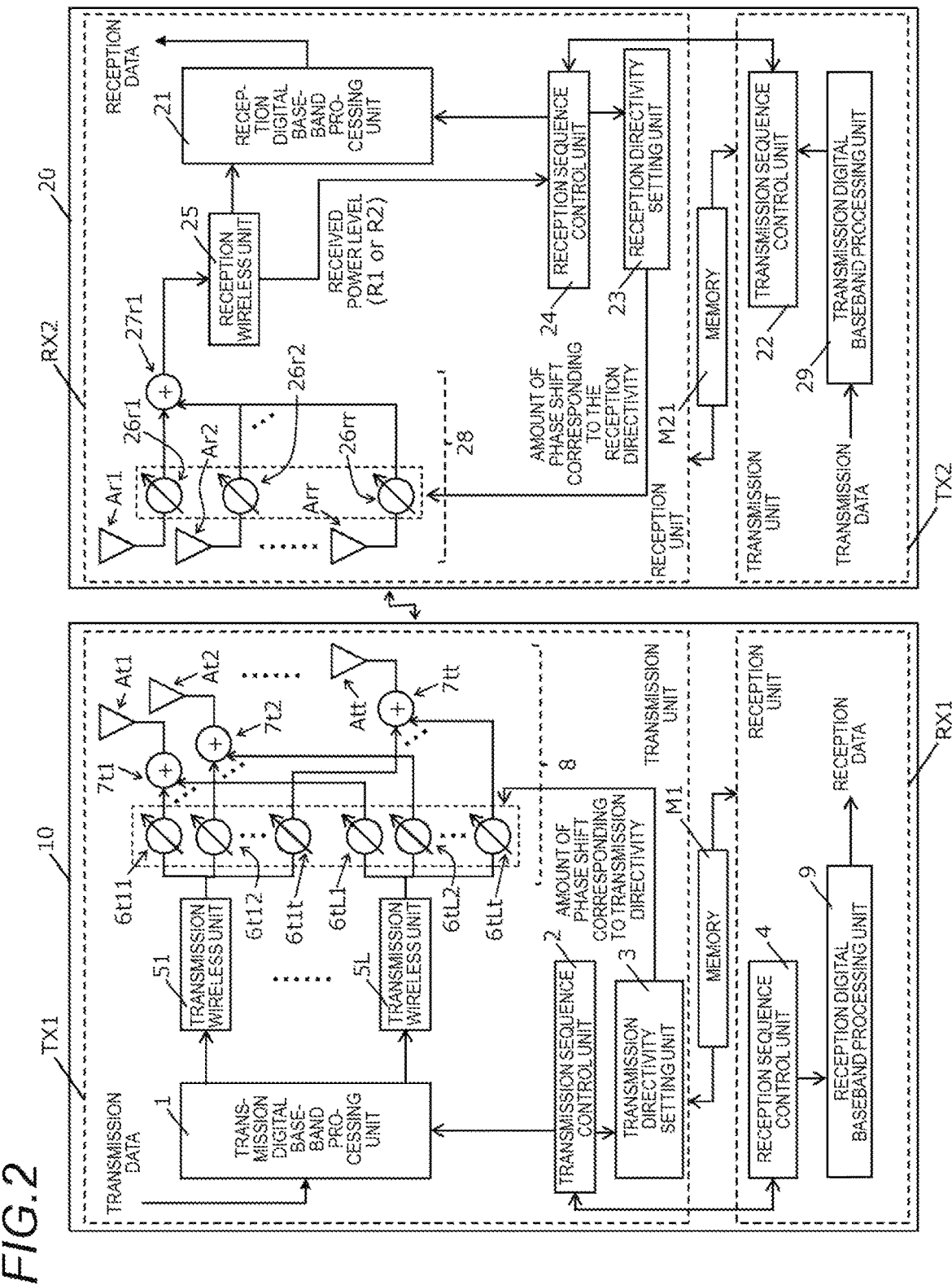
FIG. 2 is a block diagram illustrating an example of an internal configuration of a wireless transmitter and a wireless receiver according to Embodiment 1.

FIG. 2 is a block diagram illustrating in detail an example of an internal configuration of a wireless transmitter 10 and a wireless receiver 20 according to Embodiment 1. For easy-to-understand description of Embodiment 1, the wireless transmitter 10 and the wireless receiver 20 are described as corresponding to each of the communication terminals UE1 to UE6 (refer to FIG. 1) and each of the base stations BS1 to BS4 (refer to FIG. 1), respectively, but the wireless transmitter 10 and the wireless receiver 20 may be the reverse of one another. Namely, the wireless transmitter 10 may correspond to each of the base stations BS1 to BS4 (refer to FIG. 1) and the wireless receiver 20 may correspond to each of the communication terminals UE1 to UE6 (refer to FIG. 1).

The wireless transmitter 10 includes a transmission unit TX1, a memory M1, and a reception unit RX1. The wireless transmitter 10, for example, is a communication terminal that possibly wirelessly communicates with any of the base stations BS1 to BS4 in the within-factory area WL1, and is specifically a smartphone that a user carries with him/her, a tablet terminal, a Personal Digital Assistant (PDA), an Internet of Things (IoT) equipment, such as a stationary-type sensor or a monitoring camera, or the like.

The transmission unit TX1 has a transmission digital baseband processing unit 1, a transmission sequence control unit 2, a transmission directivity setting unit 3, L (L: an integer that is equal to or greater than 2) transmission wireless units, transmission wireless units 51 and so forth up to 5L, and a directivity transmission antenna unit 8. The reception unit RX1 at least has a reception sequence control unit 4 and a reception digital baseband processing unit 9.

A Central Processing Unit (CPU), a Digital Signal Processor (DSP), or a processor (that is omitted from the figure), which is configured with a Field Programmable gateway (FPGA) is built into the wireless transmitter 10. Functional configurations of the transmission digital baseband processing unit 1, the transmission sequence control unit 2, the transmission directivity setting unit 3, the reception sequence control unit 4, and the reception digital baseband processing unit 9, for example, are realized by the processor operating in cooperation with the memory M1.

The transmission digital baseband processing unit 1 inputs transmission data from a transmission data generation unit (that is omitted from the figure), such as an application that is executed in the wireless transmitter 10. The transmission digital baseband processing unit 1 performs various signal processing operations in a baseband (so-called baseband signal processing operations) on the transmission data, according to a control signal from the transmission sequence control unit 2 and generates a baseband transmission signal. Example of baseband processing in the transmission unit TX1 includes coding processing, digital analog (DA) conversion for converting a digital signal to an analog signal, and modulation processing of transmission data in compliance with a Modulation Coding Scheme (MCS). The transmission digital baseband processing unit 1 output the transmission signal that undergoes the signal processing, to each of the L transmission wireless units 51 to 5L.

Regarding every data transmission periodicity FRM (refer to FIG. 3) of wireless communication that uses the high frequency band, such as the millimeter wave band, that is described above, the transmission sequence control unit 2 controls performing of a communication sequence that is performed for a directivity determination duration F1 of approximately 1 millisecond, which is the front of the data transmission periodicity FRM, in cooperation with the reception sequence control unit 4. The communication sequence refers to a sequence of operation procedures for determining the transmission directivity and the reception directivity relating to beamforming that is formed for data communication in a wireless link between the wireless transmitter 10 and the wireless receiver 20, during the directivity determination duration F1 described above.

The transmission directivity setting unit 3 causes the transmission directivity relating to the beamforming to be formed in the directivity transmission antenna unit 8, according to the control signal from the transmission sequence control unit 2. Specifically, the transmission directivity setting unit 3 derives an amount of phase shift for each variable phase shifter that corresponds to the transmission directivity which is designated in the control signal from the transmission sequence control unit 2, and sets the amount of phase shift, which is derived for each variable phase shifter, to be in a corresponding variable phase shifter.

Each of the L (L: an integer that is equal to or greater than 2) transmission wireless units 51 to 5L operates in the same manner, and inputs a transmission signal from the transmission digital baseband processing unit 1. Each of the L transmission wireless units 51 to 5L perform conversion into a transmission radio frequency (RF) signal in the high frequency band, such as the millimeter wave band, that is described above, and performs processing that amplifies a transmission power up to a prescribed level which does not exceed a maximum level of the transmission power that corresponds to the wireless communication standard. For example, the transmission wireless unit 51 sends the transmission RF signal that results from performing the amplification processing of the transmission power, to each of t variable phase shifters, variable phase shifters 6t11 to 6t1t, that correspond to the transmission wireless unit 51. In the same manner, the transmission wireless unit 5L outputs the transmission RF signal that results from performing the amplification processing of the transmission power, to each of t variable phase shifters, variable phase shifters 6tL1 to 6tLt that correspond to the transmission wireless unit 5L.

The directivity transmission antenna unit 8 is configured with (t×L) variable phase shifters, variable phase shifters 6t11, 6t12, and so forth up to 6t1t, and 6tL1, 6tL2, and so forth up 6tLt, t adders, 7t1, 7t2, and so forth up to 7tt, and t transmission antenna elements, transmission antenna elements At1, At2, and so forth up to Att. t is an integer that is equal to or greater than 2. The t variable phase shifters, the variable phase shifters 6t11 to 6t1t are provided in a manner that corresponds to the transmission wireless unit 51, and, in the same manner, the t variable phase shifters, the variable phase shifters 6tL1 to 6tLt are provided in a manner that corresponds to the transmission wireless unit 5L. Furthermore, the adder 7t1 is provided in a manner that corresponds to the transmission antenna element At1, the adder 7t2 is provided in a manner that corresponds to the transmission antenna element At2, and, in the same manner, the adder 7tt is provided in a manner that corresponds to the transmission antenna element Att.

The variable phase shifters 6t11, and so forth up to 6tL1 variably adjust phase values, respectively, of the transmission RF signals from the corresponding transmission wireless units 51 and so forth up to 5L according to a corresponding amount of phase shift from the transmission directivity setting unit 3, and output the resulting transmission RF signals to the adder 7t1. In the same manner, the variable phase shifter 6t1t, and so forth up to 6tLt variably adjust phase values of the transmission RF signals of the corresponding transmission wireless units 51 and so forth up to 5L according to a corresponding amount of phase shift from the transmission directivity setting unit 3, and outputs the resulting signal to the adder 7tt.

The adder 7t1 adds up the transmission RF signals from the L variable phase shifters, the variable phase shifters 6t11 and so forth up to 6tL1 and outputs the resulting transmission RS signal to the transmission antenna element At1. Accordingly, the transmission antenna element At1 transmits the RF signal (namely, the transmission RF signal that results from performing signal processing relating to the beamforming for forming the transmission antenna element) that results from the addition by the adder 7t1, toward the wireless receiver 20. In the same manner, the adder 7tt adds up the transmission RF signals from the L variable phase shifters, the variable phase shifters 6t1t and so forth up to 6tLt, and outputs the resulting transmission RS signal to the transmission antenna element Att. Accordingly, the transmission antenna element Att transmits the RF signal (namely, the transmission RF signal that results from performing the signal processing relating to the beamforming for forming the transmission antenna element) that results from the addition by the adder 7tt, toward the wireless receiver 20.

The memory M1, for example, has a Random Access Memory (RAM) as a work memory that is used when the wireless transmitter 10 performs processing, and a Read Only Memory (ROM) in which a program and data that define operation of the wireless transmitter 10 are stored. Data or information that is generated or acquired by the wireless transmitter 10 is retained temporarily in the RAM. The program that defines the operation (for example, a step (processing) that is performed by the wireless transmitter 10) of the wireless transmitter 10 is written to the ROM.

Regarding every data transmission periodicity FRM (refer to FIG. 3) of the wireless communication that uses the high frequency band, such as the millimeter wave band, that is described above, the reception sequence control unit 4 controls performing of the communication sequence that is performed for the directivity determination duration F1 of approximately 1 millisecond (refer to FIG. 3), which is the front of the data transmission periodicity FRM, in cooperation with the transmission sequence control unit 2.

The reception digital baseband processing unit 9 performs various signal processing operations in a baseband (so-call baseband signal processing operations) on a baseband band reception signal (refers to a description that will be provided below) that is input, according to a control signal from the reception sequence control unit 4, and generates reception data. Example of baseband processing in the reception unit RX1 include decoding processing, analog digital (AD) conversion for converting an analog signal to a digital signal, and demodulation processing of the reception signal in compliance with the Modulation Coding Scheme (MCS). The reception digital baseband processing unit 9 outputs the reception signal that undergoes the signal processing.

It is noted that the reception unit RX1 has the same configuration as, and operates in the same manner as, a reception unit RX2 of the wireless receiver 20 and therefore that descriptions of constituent elements other than the reception sequence control unit 4 and the reception digital baseband processing unit 9 within the reception unit RX1 are omitted here.

The wireless receiver 20 includes the reception unit RX2, a memory M21, and a transmission unit TX2. The wireless receiver 20, for example, is a base station that possibly wirelessly communicates with any one of the communication terminals UE1 to UE6 in the within-factory area WL1.

The reception unit RX2 at least has a reception digital baseband processing unit, a reception digital baseband processing unit 21, a reception sequence control unit 24, a reception directivity setting unit 23, a reception wireless unit 25, and a directivity reception antenna unit 28. The transmission unit TX2 at least has a transmission sequence control unit 22 and a transmission digital baseband processing unit 29.

For example, a CPU, a DSP, or a processor (that is omitted from the figure) that is configured using a FPGA, is built into the wireless receiver 20. Functional configurations of the reception digital baseband processing unit 21, the reception sequence control unit 24, the reception directivity setting unit 23, the transmission sequence control unit 22, and the transmission digital baseband processing unit 29, for example, are realized by the processor operating in cooperation with the memory M21.

The reception digital baseband processing unit 21 performs various signal processing operations in a baseband (so-call baseband signal processing operations) on a baseband band reception signal (refers to a description that will be provided below) from the reception wireless unit 25, according to a control signal from the reception sequence control unit 24, and generates reception data. Example of baseband processing in the reception unit RX2 include the decoding processing, the AD conversion for converting an analog signal to a digital signal, and the demodulation processing of the reception signal in compliance with the MCS. The reception digital baseband processing unit 21 outputs the reception signal that undergoes the signal processing.

Regarding every data transmission periodicity FRM (refer to FIG. 3) of the wireless communication that uses the high frequency band, such as the millimeter wave band, that is described above, the reception sequence control unit 24, as an example of the reception control unit, controls performing of the communication sequence that is performed for the directivity determination duration F1 of approximately 1 millisecond (refer to FIG. 3), which is the front of the data transmission periodicity FRM, in cooperation with the transmission sequence control unit 22. For example, the reception sequence control unit 24 acquires a result of measurement of the received power level from the reception wireless unit 25, determines the reception directivity that is to be used for data communication, based on the result of the determination, and outputs the resulting reception directivity to the reception directivity setting unit 23.

The reception directivity setting unit 23, as an example of a setting unit, causes the reception directivity relating to the beamforming to be formed in the directivity reception antenna unit 28 according to the control signal from the reception sequence control unit 24. Specifically, the reception directivity setting unit 23 derives an amount of phase shift for each variable phase shifter that corresponds to the reception directivity which is designated in the control signal from the reception sequence control unit 24, and sets the amount of phase shift, which is derived for each variable phase shifter, to be in a corresponding variable phase shifter.

The reception wireless unit 25 inputs a reception RF signal from an adder 27r1. The reception wireless unit 25 performs amplification processing of a received power of the reception RF signal in the high frequency band, such as the millimeter wave band, that is described above, and additionally, converts the resulting reception RF signal into a baseband band reception signal. The reception wireless unit 25 outputs the baseband band reception signal to the reception digital baseband processing unit 21. Furthermore, the reception wireless unit 25, as an example of a measurement unit, measures the received power (namely, the received power level) of the reception RF signal and outputs a result of the measurement (namely, the received power level) to the reception sequence control unit 24.

The directivity reception antenna unit 28, as an example of a reception antenna, is configured with the adder 27r1, r variable phase shifters, variable phase shifter 26r1, 26r2, and so forth up to 26rr, and r reception antenna elements, reception antenna elements Ar1, Ar2, and so forth up to Arr. r is an integer that is equal to or greater than 2, and may take the same value as, and may take a different value as, t. The variable phase shifter 26r1 is provided in a manner that corresponds to the reception antenna element Ar1, the variable phase shifter 26r2 is provided in a manner that corresponds to the reception antenna element Ar2, and the variable phase shifter 26rr is provided in a manner that corresponds to the reception antenna element Arr.

A phase value of the transmission RF signal (namely, the reception RF signal) that is received in the reception antenna element Ar1 is adjusted by the variable phase shifter 26r1 according to a corresponding amount of phase shift from the reception directivity setting unit 23. In the same manner, a phase value of the reception RF signal that is received in the reception antenna element Ar2 is adjusted by the variable phase shifter 26r2 according to a corresponding amount of phase shift from the reception directivity setting unit 23. In the same manner, a phase value of the reception RF signal that is received in the reception antenna element Arr is adjusted by the variable phase shifter 26rr according to a corresponding amount of phase shift from the reception directivity setting unit 23.

The adder 27r1 adds up the reception signals from the r variable phase shifters 26r1 to 26rr and outputs the resulting reception RF signal to the reception wireless unit 25.

The memory M21, for example, has a RAM as a working memory that is used when the wireless receiver 20 performs processing, and a ROM in which a program and data that define operation of the wireless receiver 20. Data or information that is generated or acquired by each unit of the wireless receiver 20 is retained temporarily in the RAM. The program that defines the operation (for example, a step (processing) that is performed by the wireless receiver 20) of the wireless receiver 20 is written to the ROM. Furthermore, tables T1 (refer to FIG. 4), T2 (refer to FIG. 5), T3 (refer to FIG. 7), T4 (refer to FIG. 8), T5 (refer to FIG. 9), and T6 (refer to FIG. 10), all of which will be described below, are stored in the memory M21.

The transmission digital baseband processing unit 29 inputs transmission data from a transmission data generation unit (that is omitted from the figure), such as an application that is executed in the wireless receiver 20. The transmission digital baseband processing unit 29 performs various signal processing operations in a baseband (so-called baseband signal processing operations) on the transmission data, according to a control signal from the transmission sequence control unit 22 and generates a baseband band transmission signal. Example of baseband processing in the transmission unit TX2 includes the coding processing, the DA conversion for converting a digital signal to an analog signal, and the modulation processing of transmission data in compliance with the MCS.

Regarding every data transmission periodicity FRM (refer to FIG. 3) of the wireless communication that uses the high frequency band, such as the millimeter wave band, that is described above, the transmission sequence control unit 22 controls performing of the communication sequence that is performed for the directivity determination duration F1 of approximately 1 millisecond, which is the front of the data transmission periodicity FRM, in cooperation with the reception sequence control unit 24.

It is noted that because the transmission unit TX2 has the same configuration as, and operates in the manner as, the transmission unit TX1 of the wireless transmitter 10, descriptions of constituent elements other than the transmission sequence control unit 22 and the transmission digital baseband processing unit 29 with the transmission unit TX2 are omitted here.

Figures 3, 4:
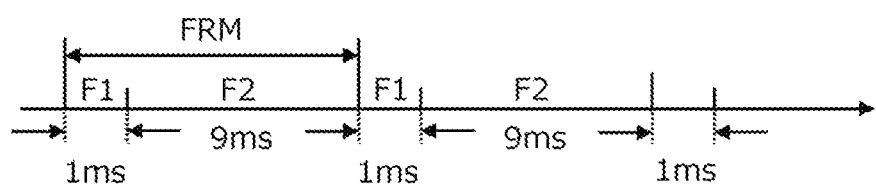
FIG. 3 is a diagram illustrating an example of a directivity determination duration that comes ahead of data transmission and reception.
FIG. 4 is a table showing a result of measurement of an SINR corresponding to scan of transmission directivity.

FIG. 3 is a diagram illustrating an example of the directivity determination duration F1 that comes ahead of data transmission and reception. Regarding every data transmission periodicity FRM (for example, 10 milliseconds) that is illustrated in FIG. 3, the wireless transmitter 10 and the wireless receiver 20 determine the corresponding transmission directivity and reception directivity, respectively, during the directivity determination duration F1 of approximately 1 millisecond, which is the front of the data transmission periodicity FRM. The wireless transmitter 10 and the wireless receiver 20 determine the corresponding transmission directivity and reception directivity, respectively, during the directivity determination duration F1, and then performs data communication during a remaining data communication duration F2 (for example, approximately 9 milliseconds).

Next, as an operation procedure in the wireless communication system 100 according to Embodiment 1, two cases, a first use case and a second use case are described exemplarily.

(First Use Case)

In the first use case, an operation procedure in a case where the wireless receiver 20 can measure a Signal to Interference plus Noise Ratio (SINR) relating to reception of a signal that is transmitted from the wireless transmitter 10 is described. In order to be able to measure the SINR, for example, it is considered that there is a need to satisfy any one of Condition 1 and Condition 2 that follow.

Condition 1: a condition in which a transmission signal that is generated in the transmission digital baseband processing unit 1 of the wireless transmitter 10 is band-spread using an identifiable spreading code that differs with a wireless link which is used for Code Division Multiple Access (CDMA) or the like.

In this case, the reception digital baseband processing unit 21 of the wireless receiver 20 performs reverse spreading processing using a corresponding spreading code, and thus can separate a signal component (a signal) from the wireless transmitter 10 in a currently-in-use wireless link and an interference component (interference) from a wireless transmitter in any other wireless link, thereby measuring the signal component from the wireless transmitter 10 in the currently-in-use wireless signal.

Condition 2: a condition in which a fixed pattern of a signal that is sent during the directivity determination duration F1 is an orthogonally intersecting pattern that varies with a wireless link.

In this case, because a fixed pattern that is transmitted from the wireless transmitter 10 differs with a wireless link in a manner that intersects orthogonally, the reception digital baseband processing unit 21 of the wireless receiver 20 can separate a signal component (a signal) from the wireless transmitter 10 in a currently-in-use wireless link and an interference component (interference) from a wireless transmitter in any other wireless signal, thereby measuring the signal component from the wireless transmitter 10 in the currently-in-use wireless link.

An operation procedure in the first use case is described with reference to FIGS. 4, 5, and 6.

FIG. 4 is a diagram illustrating the table T1 showing a result of measurement of an SINR corresponding to scan of the transmission directivity. FIG. 5 is a diagram illustrating the table T2 showing a result of measurement of an SINR corresponding to scan of the reception directivity. FIG. 6 is a flowchart illustrating an example of the operation procedure in the first use case in the wireless communication system 100 according to Embodiment 1.

In the first use case, the wireless transmitter 10 and the wireless receiver 20 that establish a new wireless link perform the following when determining each of the transmission directivity and the reception directivity in a wireless link with every data transmission periodicity FRM. Specifically, in FIG. 6, the wireless transmitter 10 determines whether or not data that has to be transmitted is present (in other words, whether or not a request is made for transmission) (St1), using the transmission sequence control unit 2. For example, with every data transmission periodicity FRM, the transmission sequence control unit 2 inquires of the transmission digital baseband processing unit 1 whether or not the data that has to be transmitted is present, and, in a case where a result that the data which has to be transmitted is present, may determine that the data which has to be transmitted is present. In processing by the wireless transmitter 10, Step St1 is repeated until it is determined that the data which has to be transmitted is present (No in St1).

In a case where it is determined that the data which has to be transmitted is present (YES in St1), the wireless transmitter 10 transmits a signal (for example, a signal with a fixed length) from the directivity transmission antenna unit 8 to the wireless receiver 20 while scanning (namely, sequentially switching among) L (L: an integer that is equal to or greater than 2, and, for example, is 64) pieces of transmission directivity in a short time using the transmission directivity setting unit 3 (St2).

The wireless receiver 20 receives a signal in a non-directional manner (namely, in a state where the directivity is not formed) using the directivity reception antenna unit 28 (this is hereinafter referred to "omnidirectional reception"), and measures an SINR (an example of a reception parameter) relating to this reception using the reception wireless unit 25 (St2). The wireless receiver 20 generates a result of measurement of an SINR relating to reception of a signal that is transmitted in a manner that corresponds to each of the L pieces of transmission directivity, and stores the generated result in the memory M21 (refer to the table T1 that is illustrated in FIG. 4).

In the table T1 that is illustrated in FIG. 4, each of the L pieces of transmission directivity and the SINR relating to the reception of the signal with each of the pieces of transmission directivity being formed are stores in a manner that is associated with each other. The wireless receiver 20 determines the transmission directivity that was used when a maximum SINR of the SINRs stored in the table T1 was obtained, using the reception sequence control unit 24. The wireless receiver 20 transmits information relating to the determined transmission directivity from the transmission unit TX2 to the wireless transmitter 10 (St2).

Where receiving the information relating to the transmission directivity that is transmitted from the wireless receiver 20 in Step St2, the wireless transmitter 10 causes the transmission directivity setting unit 3 to form the transmission directivity determined by the wireless receiver 20 in the directivity transmission antenna unit 8 (St3). Accordingly, the wireless transmitter 10 can determine the transmission directivity that is to be used for the data communication. With the formed transmission directivity, the wireless transmitter 10 transmits a signal to the wireless receiver 20 (St3).

The wireless receiver 20 receives the signal transmitted from the wireless transmitter 10, in the directivity reception antenna unit 28, while scanning (namely, sequentially switching among) M (M: an integer that is equal to or greater than 2 and, for example, is 64) pieces of reception directivity in a short time using the reception directivity setting unit 23 (St3). The wireless receiver 20 measures an SINR relating to reception of a signal in the directivity reception antenna unit 28, using the reception wireless unit 25. The wireless receiver 20 generates a result of measurement of an SINR relating to reception of a signal that is received in a manner that corresponds to each of the M pieces of reception directivity, and stores the generated result in the memory M21 (refer to the table T2 that is illustrated in FIG. 5).

Figure 5:
FIG. 5 is a table showing a result of measurement of an SINR corresponding to reception directivity.
Figure 6:
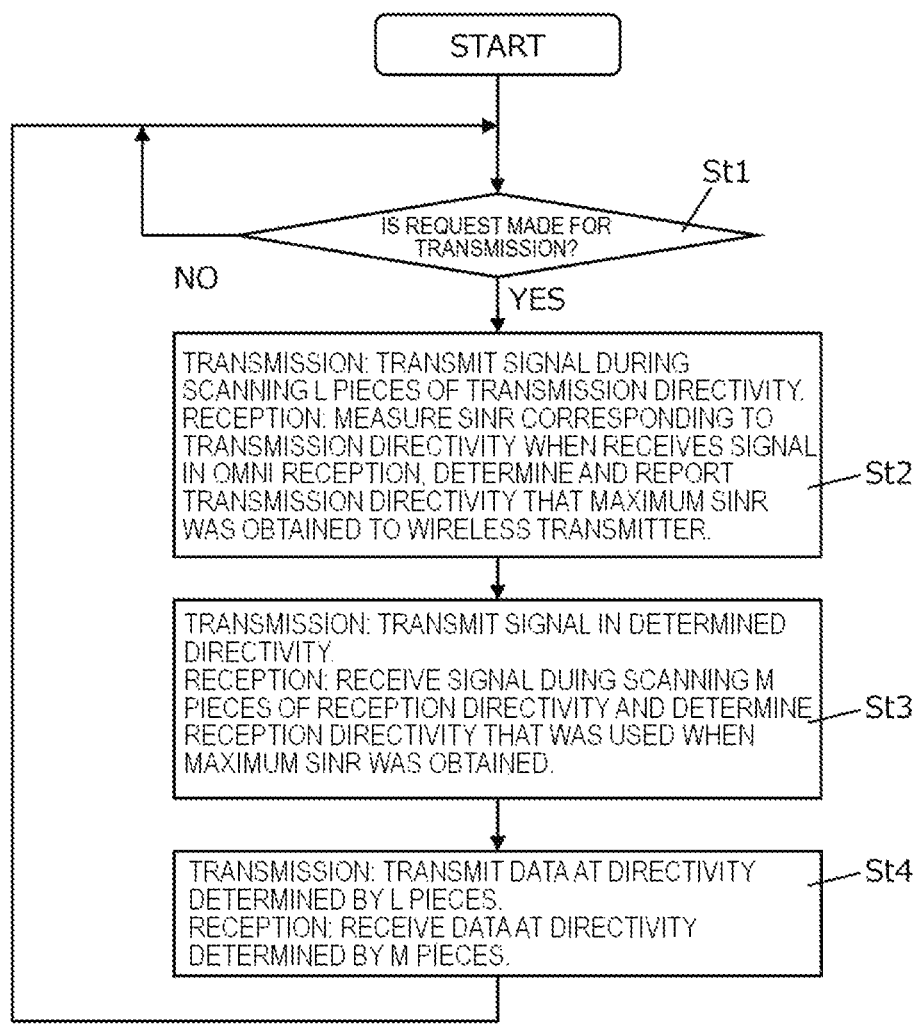
FIG. 6 is a flowchart illustrating an example of an operation procedure in a first use case in the wireless communication system according to Embodiment 1.

In the table T2 that is illustrated in FIG. 5, each of the M pieces of reception directivity and the SINR relating to the reception of the signal that is received with each of the pieces of reception directivity being formed are stored in a manner that is associated with each other. Based on a result of the measurement, the wireless receiver 20 determines the reception directivity that was used when a maximum SINR was obtained, using the reception sequence control unit 24 (St3). Accordingly, the wireless receiver 20 can determine the reception directivity that is to be used for the data communication.

Subsequent to Step St3, the wireless transmitter 10 and the wireless receiver 20 each perform data communication (namely, transmission and reception of data) during the data communication duration F2 that is later than the directivity determination duration F1 of the data transmission periodicity FRM (St4).

In this manner, in the first case in the wireless communication system 100, the wireless transmitter 10 transmits a signal to the wireless receiver 20 in such a manner as to satisfy Condition 1 and Condition 2, which are described above. Although machine different wireless links, as illustrated in FIG. 1, are formed in the vicinity, the wireless receiver 20 can separate a signal (namely, an interference component to a currently-in-use wireless link) from any other wireless link from a signal component from the wireless transmitter 10 in the currently-in-use wireless ink, and can measure an SINR. Therefore, in the first use case, the wireless communication system 100 needs to satisfy Condition 1 or Condition 2, an SINR, along with a rate, can be easily measured. Because of this, the directivity can be adaptively determined that relates to transmission and reception on the transmitting side and the receiving side in each of the wireless links, and an influence of interference from any other wireless link can be reduced to below an allowable level, thereby suppressing a deterioration in communication quality.

(Second Use Case)

In the second use case, an operation procedure in a case where the wireless receiver 20 cannot directly measure the Signal to Interference plus Noise Ratio (SINR) relating to the reception of the signal that is transmitted from the wireless transmitter 10 is described.

The operation procedure in the second use case is described with reference to FIGS. 7, 8, 9, 10, and 11.

Figure 7:
FIG. 7 is a table showing a result of measurement of a received power level that corresponds to the scan of the reception directivity in a case where radio-frequency radiation by the wireless transmitter is not present.
Figure 8:
FIG. 8 is a table showing a result of measurement that corresponds to the scan of the transmission directivity in a case where the wireless receiver performs omnidirectional reception.
Figure 11:
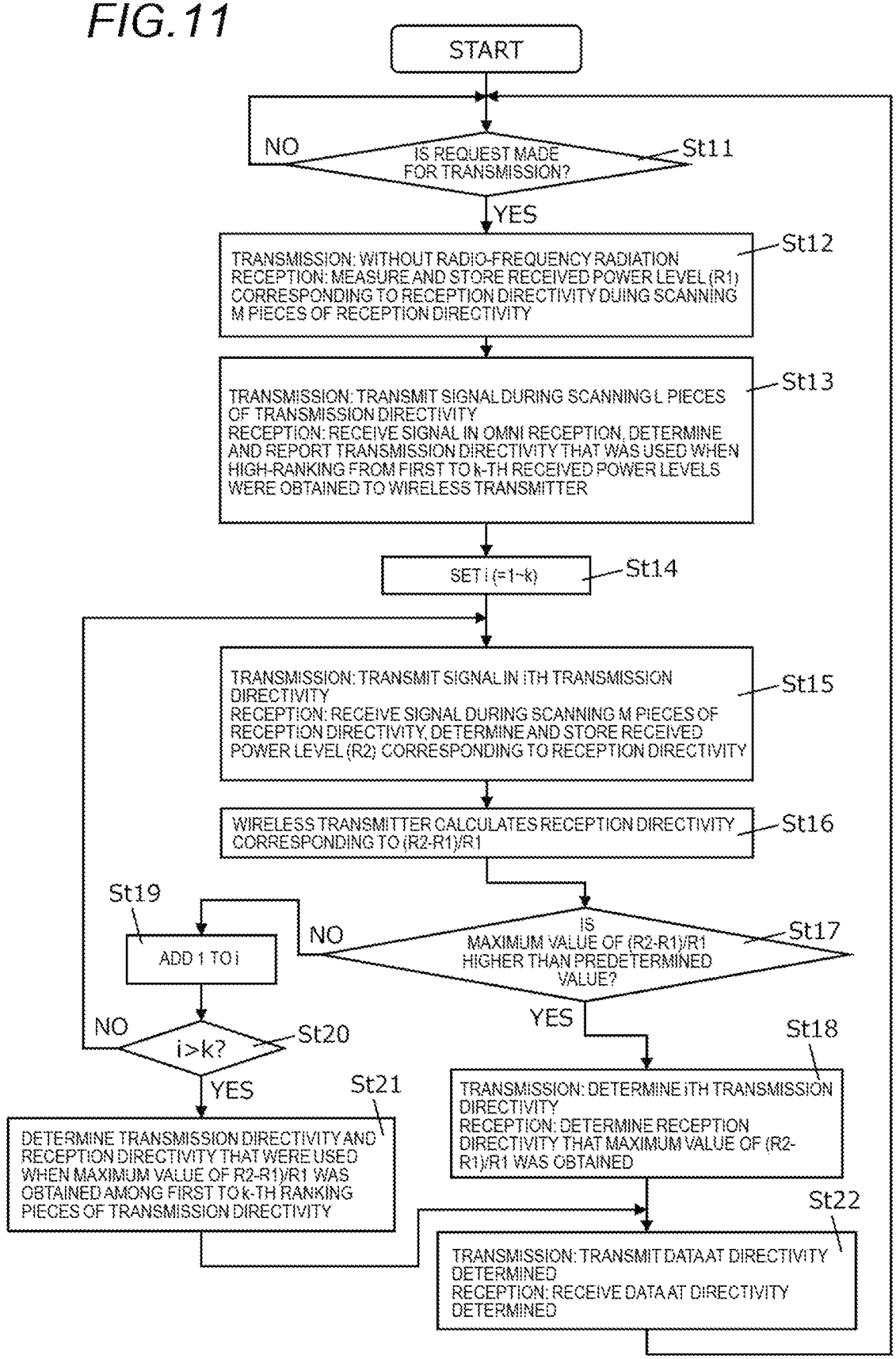
FIG. 11 is a flowchart illustrating an example of an operation procedure in a second use case in the wireless communication system according to Embodiment 1.

FIG. 7 is a diagram illustrating a table showing a result of measurement of a received power level that corresponds to the scan of the reception directivity in a case where radio-frequency radiation by the wireless transmitter is not present. FIG. 8 is a diagram illustrating a table showing a result of measurement that corresponds to the scan of the transmission directivity in a case where the wireless receiver performs the omnidirectional reception. FIG. 9 is a diagram illustrating a table showing a result of measurement of a received power level for i (=1 to k), which corresponds to the scan of the reception directivity. FIG. 10 is a diagram illustrating a table showing a result of calculation of an SINR for i (=1 to k), which corresponds to the scan of the reception directivity. FIG. 11 is a flowchart illustrating an example of an operation procedure in the second use case in the wireless communication system 100 according to Embodiment 1.

In the second use case, the wireless transmitter 10 and the wireless receiver 20 that establish a new wireless link perform the following when determining each of the transmission directivity and the reception directivity in a wireless link with every data transmission periodicity FRM. Specifically, in FIG. 10, using the transmission sequence control unit 2, the wireless transmitter 10 determines whether or not data that has to be transmitted is present (in other words, whether or not a request is made for transmission) (St11). For example, with every data transmission periodicity FRM, the transmission sequence control unit 2 inquires of the transmission digital baseband processing unit 1 whether or not the data that has to be transmitted is present, and, in a case where a result that the data which has to be transmitted is present, may determine that the data which has to be transmitted is present. In the processing by the wireless transmitter 10, Step St11 is repeated until it is determined that the data which has to be transmitted is present (No in St11).

In a case where it is determined that the data which has to be transmitted is present (YES in St1), the wireless transmitter 10 does not transmit a signal (for example, a signal with a fixed length) to the wireless receiver 20 (St12). Namely, in a case where it is determined that the data which has to be transmitted is present, the wireless transmitter 10 also omits the transmission of the signal to the wireless receiver 20.

The wireless receiver 20 receives a signal using the directivity reception antenna unit 28 while scanning (namely, sequentially switching among) M (refers to the above description) (for example 64) pieces of reception directivity in a short time using the reception directivity setting unit 23, in a state where a signal is not transmitted from the wireless transmitter 10 (namely, there is no radiation from the wireless transmitter 10) (St12). This signal is not a signal component from the wireless transmitter 10 that configures its own wireless link, and, for example, is a signal (namely, an interference component) and a noise component from the wireless transmitter in any other wireless link, which is positioned in the vicinity. The wireless receiver 20 measures a received power level (an example of a reception parameter) relating to this reception using the reception wireless unit 25 (St12). The wireless receiver 20 generates a result of the measurement (an example of a first result of the measurement) of the received power level relating to the reception of the signal that is received in a manner that corresponds to each of the M pieces of reception directivity, and stores the generated result in the memory M21 (refer to the table T3 that is illustrated in FIG. 7).

In the table T3 that is illustrated in FIG. 7, each of the M pieces of reception directivity and a received power level R1 relating to the reception of the signal that is received with each of the pieces of reception directivity being formed are stored in a manner that is associated with each other. The wireless receiver 20 determines the reception directivity that was used when a maximum received power level of the received power levels stored in the table T3 was obtained, using the reception sequence control unit 24.

Subsequent to Step St12, the wireless transmitter 10 transmits a signal (for example, a signal with a fixed length) from the directivity transmission antenna unit 8 to the wireless receiver 20 while scanning (namely, sequentially switching among) L (L is an integer that is equal to or greater than 2, and, for example, is 64) pieces of transmission directivity in a short time using the transmission directivity setting unit 3 (St13).

The wireless receiver 20 performs the omnidirectional reception of a signal in a non-directional manner (namely, in a state where the directivity is not formed) using the directivity reception antenna unit 28, and measures a received power level (an example of the reception parameter) relating to the omnidirectional reception using the reception wireless unit 25 (St13). The wireless receiver 20 generates a result of measurement of a received power level relating to reception of a signal that is transmitted in a manner that corresponds to each of the L pieces of transmission directivity, and stores the generated result in the memory M21 (refer to the table T4 that is illustrated in FIG. 8).

In the table T4 that is illustrated in FIG. 8, each of the L pieces of transmission directivity and a received power level relating to the reception of the signal that is transmitted with each of the pieces of transmission directivity being formed are stored in a manner that is associated with each other. The wireless receiver 20 defines the transmission directivity that was used when a maximum received power level of the received power levels stored in the table T4 was obtained, as the first ranking transmission directivity, and determines the transmission directivity that was used when high-ranking k (k: an integer that is equal to or greater than 2) (for example, 4) received power levels were obtained, using the reception sequence control unit 24. For reporting, the wireless receiver 20 transits information relating to the determined high-ranking k pieces of transmission directivity from the transmission unit TX2 to the wireless transmitter 10 (St13).

The wireless transmitter 10 sets a parameter i (i is an integer that ranges from 1 to k) using the transmission sequence control unit 2 and first sets i=1 using the transmission sequence control unit 2 (St14).

The wireless transmitter 10 causes the transmission directivity setting unit 3 to form the transmission directivity with parameter i=1 (namely, the time at which a maximum received power level is obtained in Step St13) in the directivity transmission antenna unit 8 (St15). With the formed transmission directivity, the wireless transmitter 10 transmits a signal to the wireless receiver 20 (St15).

The wireless receiver 20 receives the signal transmitted from the wireless transmitter 10, using the directivity reception antenna unit 28, while scanning (namely, sequentially switching among) M (for example, is 64) pieces of reception directivity in a short time in the reception directivity setting unit 23 (St15). The wireless receiver 20 measures a received power level relating to the reception of the signal in the directivity reception antenna unit 28, using the reception wireless unit 25. The wireless receiver 20 generates a result of the measurement (an example of a second result of the measurement) of the received power level relating to the reception of the signal that is received in a manner that corresponds to each of the M pieces of reception directivity, and stores the generated result in the memory M21 (refer to the table T5 that is illustrated in FIG. 9).

In the table T5 that is illustrated in FIG. 9, each of the M pieces of reception directivity and a received power level relating to the reception of the signal that is received with each of the pieces of reception directivity being formed are stored in a manner that is associated with each other. Based on the result of the measurement (namely, a received power level R2) and the result of the measurement (namely, the received power level R1) in Step St12, the wireless receiver 20 calculates an SINR relating to the reception of the signal from the wireless transmitter 10 in its own wireless link according to Equation (1) (St16). In Equation (1), the received power level R1 is a received power level relating to reception that is performed when a signal is not transmitted from the wireless transmitter 10 in its own wireless link (namely, when there is no a signal transmission). Furthermore, the received power level R2 is a received power level relating to reception that is performed when a signal is transmitted from the wireless transmitter 10 in its own wireless link (namely, a signal component is present). Therefore, a value that results from Equation (1) is equivalent an SINR in a currently-in-use wireless link.

[Equation 1]

$$\frac{R2-R1}{R1} \quad (1)$$

The wireless receiver 20 generates a result of the calculation of the SINR that is calculated according to each of the M pieces of reception directivity and stores the generated result in the memory M21 (refer to St16 and the table T6 that is illustrated in FIG. 10).

In the table T6 that is illustrated in FIG. 10, each of the M pieces of reception directivity and the SINR that is calculated in a manner that corresponds to each of the pieces of reception directivity are stored in a manner that associates them with each other. Using the reception sequence control unit 24, the wireless receiver 20 determines whether or not a maximum value that is a result of the calculation of the SINR for each of the M pieces of reception directivity that are calculated in Step St16 is higher than a prescribed value (for example, 12 dB) (St17).

In a case where it is determined that the maximum value that is the result of the calculation of the SINR is higher than the prescribed value (refer to the above description) (YES in St17), the wireless receiver 20 not only transmits information that is a value of the parameter i at that time, from the transmission unit TX2 to the wireless transmitter 10, for reporting, but also determines the reception direction that was used when the maximum value was obtained, using the reception sequence control unit 24 (St18). Accordingly, the wireless receiver 20 can determine the reception directivity that is to be used for the data communication. Furthermore, when receiving the information that is the value of the parameter i that is transmitted from the wireless receiver 20 in Step St18, the wireless transmitter 10 causes the transmission directivity setting unit 3 to form the transmission directivity that corresponds to the value of the parameter i in the directivity transmission antenna unit 8 (St18). Accordingly, the wireless transmitter 10 can determine the transmission directivity that is to be used for the data communication.

On the other hand, in a case where it is determined that the maximum value of the result of the calculation of the SINR is higher than the prescribed value (refer to the above description) (NO in St17), the wireless receiver 20 generates an instruction that 1 is added to the value of the parameter i, in the reception sequence control unit 24, and transmits the instruction from the transmission unit TX2 to the wireless transmitter 10.

When receiving the instruction that is transmitted from the wireless receiver 20, the wireless transmitter 10 adds (namely, increments) 1 to the parameter i that is set in Step St14, using the transmission sequence control unit 2 (St19). The wireless transmitter 10 determines whether or not the parameter i that results from the increment in Step St19 is greater than k, using the transmission sequence control unit 2 (St20). In a case where it is determined that the parameter i that results from the increment in Step St19 is not greater than k (NO in St20), the processing by the wireless transmitter 10 returns to Step St15.

On the other hand, in a case where it is determined that the parameter i that results from the increment in Step St19 is greater than k (YES in St20), the wireless transmitter 10 transmits information to that effect from the transmission unit TX1 to the wireless receiver 20. Based on the information transmitted from the wireless transmitter 10, the wireless receiver 20 determines the transmission directivity that were used when a maximum value of an SINR, among the first to k-th ranking pieces of transmission directivity, and the reception directivity, using the reception sequence control unit 24 (St21). For example, the reception sequence control unit 24 can select a result of the calculation of the SINR, which takes a maximum value that does not exceed a prescribed value (for example, 12 dB), referring to the table T6 that is illustrated in FIG. 10, and can determine the transmission directivity and the reception directivity that correspond to the SINR. Accordingly, the wireless receiver 20 can determine the reception directivity that is to be used for the data communication.

It is noted that the wireless receiver 20 transmits information relating to the transmission directivity that is determined in Step St21, from the transmission unit TX2 to the wireless transmitter 10. Where receiving the information relating to the transmission directivity that is transmitted from the wireless receiver 20, the wireless transmitter 10 causes the transmission directivity setting unit 3 to form the transmission directivity determined by the wireless receiver 20 in the directivity transmission antenna unit 8. Accordingly, the wireless transmitter 10 can determine the transmission directivity that is to be used for the data communication.

Subsequent to Step St18 or Step St21, the wireless transmitter 10 and the wireless receiver 20 each perform data communication (namely, transmission and reception of data) during the data communication duration F2 that is later than the directivity determination duration F1 of the data transmission periodicity FRM (St22).

In this manner, in the second use case in the wireless communication system 100, the wireless receiver 20 measures a reception parameter (for example, a received power level) while scanning the M piece of reception directivity for an interval during which a signal is not transmitted from the wireless transmitter 10, and retains the first result of the measurement. The wireless transmitter 10 transmits a signal to the wireless receiver 20 while scanning the L pieces of transmission directivity. The wireless receiver 20 measures a reception parameter (for example, a received power level) relating to reception of a signal that is transmitted at each of the L pieces of transmission directivity, and, for reporting to the wireless transmitter 10, determines the k pieces of transmission directivity that correspond to high-ranking k results of the measurement, respectively, that have a great reception parameter. The wireless transmitter 10 forms any one of the k pieces of transmission directivity and transmits the formed transmission directivity to the wireless receiver 20. The wireless receiver 20 measures a reception parameter (for example, a received power level) relating to the reception of the signal that is transmitted from the wireless transmitter 10 while scanning the M pieces of reception directivity and retains the second result of the measurement. Based on the first result of the measurement and the second result of the measurement, the wireless receiver 20 determines that reception directivity that is to be used for the data communication, from among the M pieces of reception directivity.

Accordingly, in a case where multiple different wireless links that use the same frequency in the high frequency band, such as the millimeter wave band, that are described above, are positioned in the vicinity, the wireless communication system 100 can also adaptively the directivity relating to transmission and reception on the transmitting side (namely, the wireless transmitter 10) and the receiving side (namely, the wireless receiver 20) in each of the wireless links. Therefore, in the wireless communication system 100, the Signal to Interference plus Nose Ratio (SINR) can be substantially obtained in the wireless transmitter 10 and the wireless receiver 20 in their own wireless links. Namely, the transmission directivity and the reception directivity in currently-in-use wireless links are determined from the SINR. For this reason, in the wireless communication system 100, an influence of interference from any other wireless link is reduced to below an allowable level (for example, to the degree to which discontinuance of wireless communication in the high frequency band, such as the millimeter wave band that has the enhanced ability of a radio wave to propagate in a straight line), and thus a deterioration in communication quality in a currently-in-use wireless link can be suppressed. Furthermore, in the wireless communication system 100, the transmission directivity and the reception directivity can be determined that are to be used for the data communication autonomously and distributively in a manner that is closed to each of the multiple wireless links. Because of this, for example, complicated processing can be made unnecessary such as one that manages the transmission directivity and the reception directivity in each of all the multiple wireless links in a centralized control-type database or the like.

Furthermore, the wireless transmitter 10 determines the transmission directivity that corresponds to the reception directivity that is to be used for the data communication, which is determined by the wireless receiver 20, as the transmission directivity that is to be used for the data communication. Accordingly, the wireless transmitter 10 can suppress an influence from any other link and thus can set the transmission directivity for performing satisfactory data communication.

Furthermore, the wireless receiver 20 receives a signal that is transmitted at each of the L pieces of transmission directivity, in a non-directional manner. Accordingly, the wireless receiver 20 receives signals that the wireless transmitter 10 transmits while scanning the L pieces of transmission directivity, equally in a non-directional manner. Because of this, the wireless receiver 20 can adaptively determine which transmission directivity of the L pieces of transmission direction is suitable for data communication in its own wireless link.

Furthermore, the wireless transmitter 10 forms the k pieces of transmission directivity in the order of pieces of transmission directivity that corresponds to the order of magnitudes of the high-ranking k results of the measurement. Accordingly, because signal are transmitted in the order of high-ranking k pieces of transmission directivity that have a great parameter when performing the omnidirectional reception, the wireless receiver 20 can quickly determine the reception directivity that is to be used for the data communication.

Furthermore, with the first result of the measurement and the second result of the measurement, the wireless receiver 20 calculates a Signal to Interference plus Noise Ratio (SINR) and determines the reception directivity that satisfies a result of the calculation of the SINR which exceeds a prescribed value, as the reception directivity that is to be used for the data communication. Accordingly, the wireless receiver 20, although it cannot measure the SINR in its own wireless link, can substantially calculate the SINR, and because of this, can precisely determine the reception directivity that is to be used for the data communication that is stabilized and is satisfactory to the degree to which the SINR exceeding a prescribed value is obtained.

Furthermore, in a case where a result of the calculation of the SINR does not exceed the prescribed value, the wireless receiver 20 determines the reception directivity that satisfies a maximum value of the result of the calculation of the SINR, as the reception directivity that is to be used for the data calculation. Accordingly, in a case where the SINR that does not exceed the prescribed value is obtained, the wireless receiver 20 can also determine that the reception directivity, a maximum SINR for which is obtained among the SINRs, is to be used for the data communication. Because of this, comparatively satisfactory data communication can be performed.

Transmission sequence processing (an example of a communication sequence) that determines the communication directivity which is to be used by the wireless transmitter 10 for data communication, and reception sequence processing (an example of the communication sequence) that determines the reception directivity which is to be used by the wireless receiver 20 for data communication are performed with every transmission periodicity for data communication (namely, the data transmission periodicity FRM). Accordingly, in a case where the wireless transmitter 10 or the wireless receiver 20 acts such as moving, the wireless communication system 100 can determine the transmission directivity and the reception directivity that are to be used for the data communication, momentarily with every periodic data transmission periodicity, and because of this, can perform stable and satisfactory data communication.

An embodiment is described above with reference to the accompanying drawings, but the present disclosure is not limited to such an example. It is apparent to a person of ordinary skill in the related art that various modification examples, revision examples, replacement examples, addition examples, deletion example, and equivalent examples are contemplated, and it is understood that these also belong to the technical scope of the present disclosure. Furthermore, the constituent elements in the embodiment, which are described above, may be arbitrarily combined within the scope that does not depart from the gist of the invention.

Figure 12:
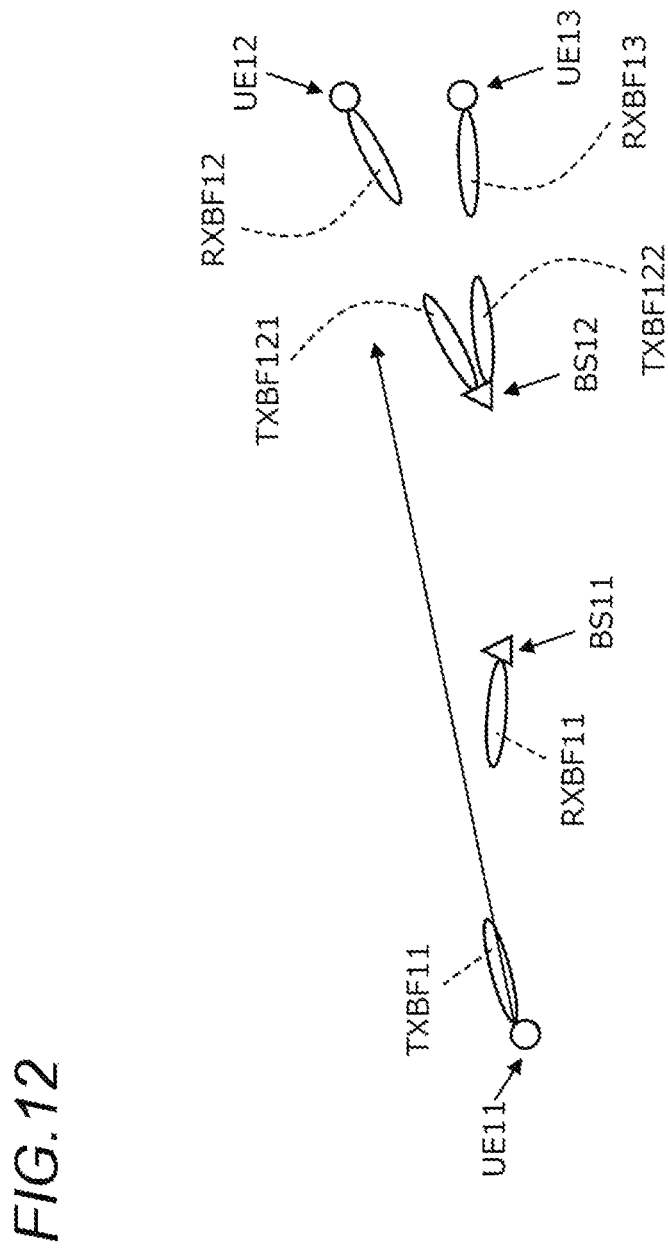
FIG. 12 is a diagram illustrating another example of positioning of the wireless communication system according to Embodiment 1.
Figure 13:
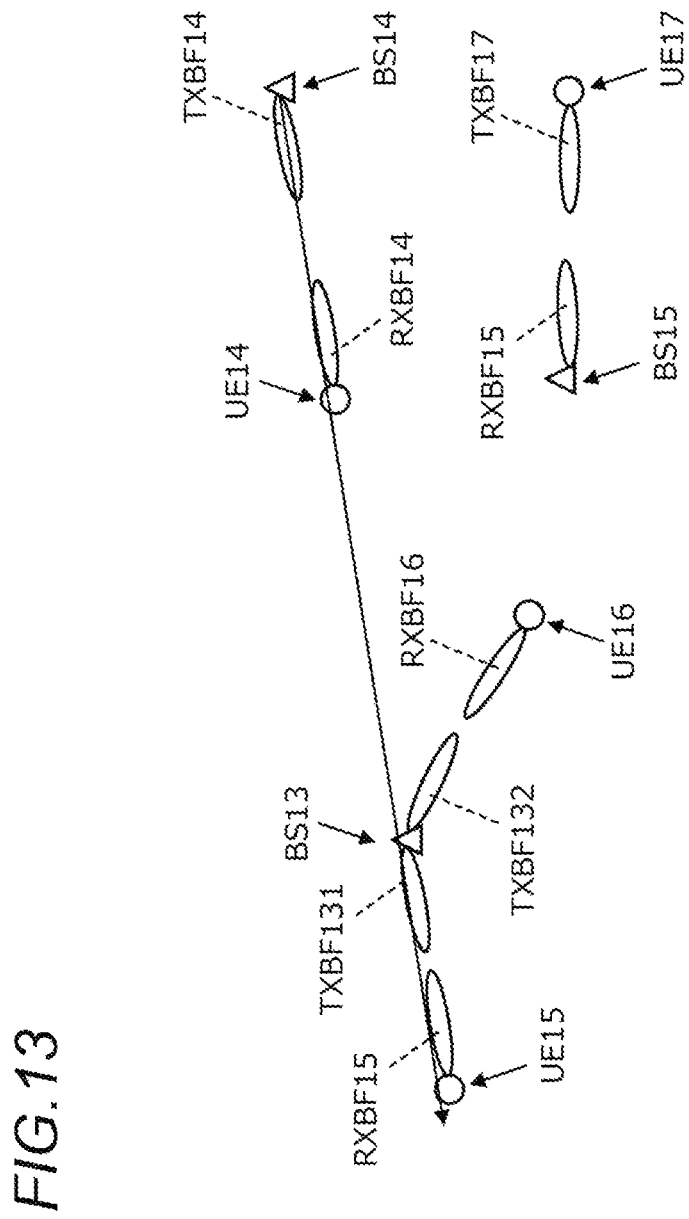
FIG. 13 is a diagram illustrating another example of the positioning of the wireless communication system according to Embodiment 1.
Figure 14:
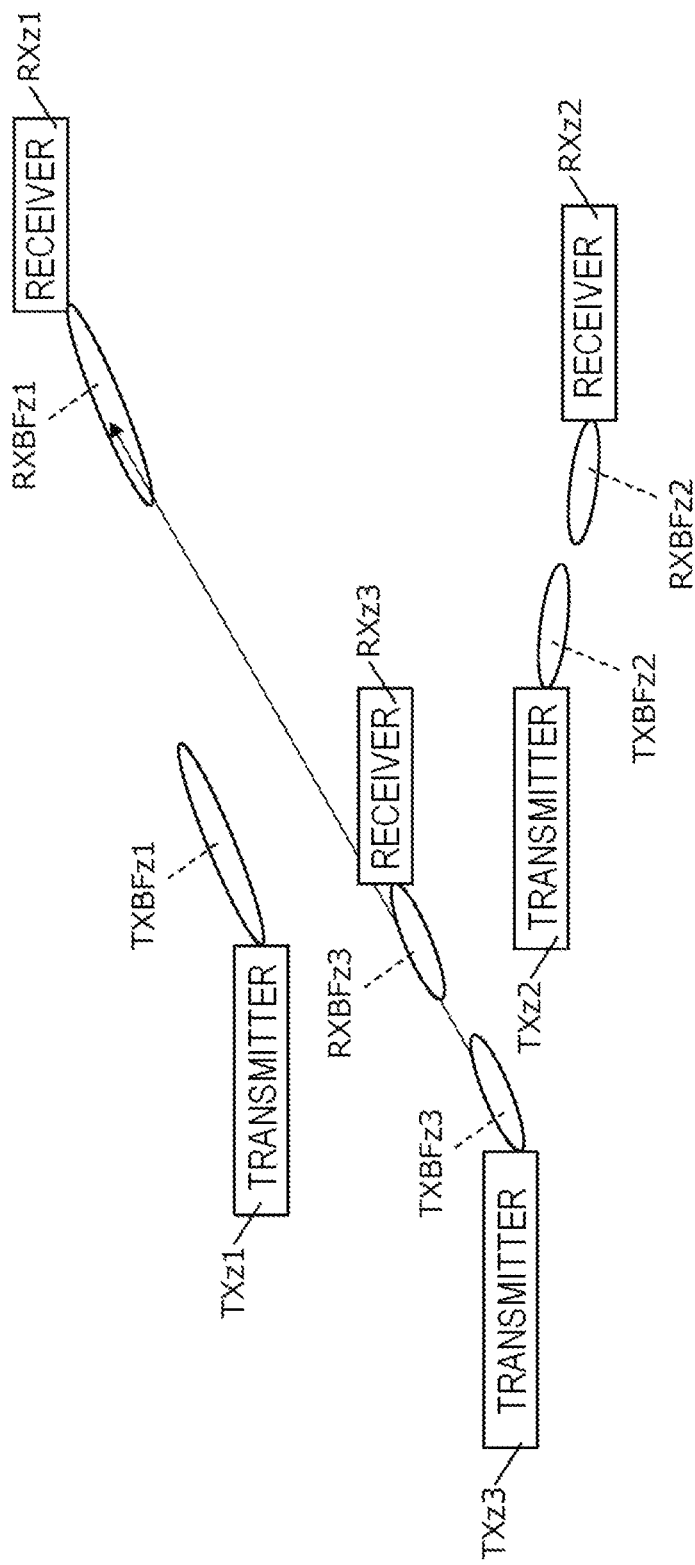
FIG. 14 is a diagram for describing a problem in the related art.

For example, the wireless communication system 100 according to Embodiment 1 is described above as being installed within the communication area that a physically narrow site, such as the within-factory area WL1, but an example of an area in which the wireless communication system 100 finds application is not limited to the within-factory area WL1 (refer to FIGS. 12 and 13). FIGS. 12 and 13 are schematic diagrams each illustrating another example of the wireless communication system 100 according to Embodiment 1.

Another example of positioning of the wireless communication system 100 that uses a wireless link in a high frequency band, such as one for a millimeter wave band or the 5-th mobile communication system (5G), is given as a substitute for Fiber To The Home (FTTH) technology in which a propagation path for optical communication extends to a general individual house using an optical fiber.

For example, as illustrated in FIG. 12, a base station BS12 (an example of the wireless transmitter 10) that is attached to a telegraph pole which is installed outside the general individual house and gateway apparatuses UE12 and UE13 (examples of the wireless receiver 20) each of which is installed inside the general individual house form wireless links that are FTTH replacements. More specifically, the base station BS12 forms transmission directivity TXBF 121 and thus performs data communication, and the gateway apparatus UE12 forms reception directivity RXBF 12 and thus performs data communication. In the same manner, the base station BS12 forms transmission directivity TXBF 122 and thus performs data communication, and the gateway apparatus UE13 forms reception directivity RXBF 13 and thus performs data communication. Thereafter, it is assumed that the base station BS11 (an example of the wireless transmitter 10) that is attached to the telegraph pole which is installed outside the general individual house, and the gateway apparatus UE11 (an example of the wireless receiver 20) which is installed inside the general individual house are installed in such a manner as to form a wireless link that is a FTTH replacement.

It is considered that the wireless link that is the substitute for the FTTH is longer in propagation distance than the wireless link in the within-factory area WL1 and that the transmission directivity and the reception directivity that are higher are necessary for the wireless transmitter 10 and the wireless receiver 20, respectively. Furthermore, in an outdoor environment, a satisfactory reflection path (in other words, a reflection path that provides a high SINR) is not necessarily present.

Thus, while wireless links (namely, a wireless link between the base station BS12 and the gateway apparatus UE12, and a wireless link between the base station BS12 and the gateway apparatus UE13), which have already been formed, are present (refer to FIG. 12), in a case where a wireless link between the base station BS11 and the gateway apparatus UE11 is added and formed later, the gateway apparatus UE11 performs the same processing in the embodiment described above, and thus determines and forms transmission directivity TXBF 11 in such a manner as to maximize an SINR. The base station BS11 forms reception directivity RXBF 11 in such a manner as to maximize the SINR. In order to suppress an influence on the wireless links, which have already been formed, there is a high likelihood that the transmission directivity TXBF 11 and the reception directivity RXBF 11 will be pieces of directivity that are shifted to a small degree from the transmission directivity and the reception directivity, respectively, at which a signal component (a signal) in the wireless link between the gateway apparatus UE11 and the base station BS11 is maximized.

For example, as illustrated in FIG. 13, the base station BS13 (an example of the wireless transmitter 10) that is attached to the telegraph pole which is installed outside the general individual house and the gateway apparatuses UE15 and the UE16 (examples of the wireless receiver 20) each of which is installed inside the general individual house form wireless links that are FTTH replacements. More specifically, the base station BS13 forms transmission directivity TXBF 131 and thus performs data communication, and the gateway apparatus UE15 forms reception directivity RXBF 15 and thus performs data communication. In the same manner, the base station BS13 forms transmission directivity TXBF 132 and thus performs data communication, and the gateway apparatus UE16 forms reception directivity RXBF 16 and thus performs data communication. Furthermore, a base station BS15 (an example of the wireless receiver 20) that is attached to the telegraph pole which is installed outside the general individual house and a gateway apparatus UE17 (an example of the wireless transmitter 10) that is installed inside each of the general individual houses form a wireless link that is a FTTH replacement. More specifically, the gateway apparatus UE17 forms transmission directivity TXBF 17 and thus performs data communication, and the base station BS15 forms reception directivity RXBF 15 and thus performs data communication. Thereafter, it is assumed that the base station BS14 (an example of the wireless transmitter 10) that is attached to the telegraph pole which is installed outside the general individual house, and the gateway apparatus UE14 (an example of the wireless receiver 20) which is installed inside the general individual house are installed in such a manner as to form a wireless link that is a FTTH replacement.

In the same manner, while wireless links (namely, a wireless link between the base station BS13 and each of the gateway apparatus UE15 and UE16, and a wireless link between the base station BS15 and the gateway apparatus UE17), which have already been formed, are present (refer to FIG. 13), in a case where a wireless link between the base station BS14 and the gateway apparatus UE14 is added and formed later, the base station BS14 forms the same processing as in the embodiment described above, and thus determines and forms transmission directivity TXBF 14 in such a manner as to maximize an SINR. The gateway apparatus gateway UE14 forms reception directivity RXBF14 in such a manner as to maximize the SINR. In order to suppress an influence on the wireless links, which have already been formed, there is a high likelihood that the transmission directivity TXBF 14 and the reception directivity RXBF 14 will be pieces of directivity that are shifted to a small degree from the transmission directivity and the reception directivity, respectively, at which a signal component (a signal) in the wireless link between the gate array apparatus UE14 and the base station BS14 is maximized.

In this manner, in the use case that is the FTTH replacement, such as in an outdoor environment, without any limitation to a closed communication area that is a physically narrow site, such as the within-factory area WL1, the wireless communication system 100 also determines the transmission directivity and the reception directivity in such a manner as to maximize an SINR equally in individual wireless links while an influence of any other wireless link is reduced to below an allowable level. Accordingly, individual wireless links in each of which stable communication is realized can be introduced simply and cheaply without incurring a high construction cost of installing an optical fiber. In this respect, not only is a lot of user merit provided, but it is also possible that satisfactory communication is expected in each of the wireless links.

The present disclosure is useful in implementing a wireless communication system, a wireless communication apparatus, and a directivity determination method that, in a case where multiple different wireless links that use the same frequency in a high frequency band are present in the vicinity, are also capable of adaptively determining the directivity relating to transmission and reception on the transmitting side and the receiving side in each of the wireless links, of reducing an influence from any other wireless link to below an allowable, and thus of suppressing a deterioration in communication quality.

This application is based on and claims the benefit of the Japanese patent application No. 2018-158211 filed on Aug. 27, 2018, the contents of which are incorporated herein by reference in its entirety.

What is claimed is:

1. A wireless communication system for adaptively determining a communication directivity when a Signal to Interference plus Noise Ratio (SINR) is not directly measurable, the system comprising:
   a wireless transmitter, and
   a wireless receiver, wherein,
   in a first step,
      the wireless receiver measures a reception parameter while scanning M pieces of reception directivity during an interval in which a signal is not transmitted from the wireless transmitter, where M is an integer that is equal to or greater than 2, and retains a first result of the measurement which includes interference plus noise, and in a second step, the wireless transmitter transmits a first signal to the wireless receiver while scanning L pieces of transmission directivity, where L is an integer that is equal to or greater than 2, the wireless receiver measures a reception parameter relating to reception of the first signal that is transmitted at each of the L pieces of transmission directivity, determines k pieces of transmission directivity that correspond to high-ranking k results, respectively, of the measurements that have a great reception parameter, and reports the determined k pieces of transmission directivity to the wireless transmitter, where k is a predetermined integer value <L, the wireless transmitter forms any one of the k pieces of transmission directivity and transmits a second signal to the wireless receiver, and the wireless receiver:

measures a reception parameter relating to reception of the second signal that is transmitted by the wireless transmitter, while scanning the M pieces of reception directivity, and retains a second result of the measurement which includes both the second signal and the interference plus noise, and calculates an SINR of each of the M pieces of reception directivity based on a comparison between the first result of the measurement obtained in the first step and the second result of the measurement obtained in the second step, and determines a reception directivity having an SINR exceeding a prescribed value, among the M pieces of reception directivity, for use in data communication.

2. The wireless communication system according to claim 1, wherein the wireless transmitter determines a transmission directivity that corresponds to the reception directivity, which is determined by the wireless receiver, for use in the data communication.

3. The wireless communication system according to claim 1, wherein the wireless receiver receives the first signal that is transmitted at each of the L pieces of transmission directivity, in a omnidirectional manner.

4. The wireless communication system according to claim 1, wherein the wireless transmitter forms the k pieces of transmission directivity in an order of pieces of transmission directivity that corresponds to a descending order of the high-ranking k results of the measurement.

5. The wireless communication system according to claim 1, wherein, the wireless receiver calculates an SINR based on a difference between the first result of the measurement and the second result of the measurement.

6. The wireless communication system according to claim 1, wherein, responsive to no SINR calculated for each of the M pieces of reception directivity exceeding the prescribed value, the wireless receiver determines a reception directivity having a maximum SINR, among the M pieces of reception directivity, for use in the data communication.

7. The wireless communication system according to claim 1, wherein transmission sequence processing that determines a transmission directivity which is to be used by the wireless transmitter for the data communication, and reception sequence processing that determines a reception directivity which is to be used by the wireless receiver for the data communication are performed with every transmission periodicity for the data communication.

8. A wireless communication apparatus that is communicatively connected to a wireless transmitter, the wireless communication apparatus comprising:

a reception antenna unit that receives a signal which is transmitted from the wireless transmitter;

a memory storing instructions; and a processor configured to implement the instructions and execute a plurality of tasks, including:

in a first step, a setting task that sets M pieces of reception directivity in the reception antenna unit in a manner that is scannable, where M is an integer that is equal to or greater than 2;

a measurement task that measures a reception parameter at each of the M pieces of reception directivity during an interval in which a signal is not transmitted from the wireless transmitter; and a storing task that stores a first result of the measurement of the reception parameter into the memory, wherein the first result of the measurement includes interference plus noise; and in a second step, a reception control task that determines k pieces of transmission directivity which correspond to high-ranking k results, respectively, of the measurements that have a great reception parameter, based on a result of measurement of a reception parameter relating to reception of a first signal that is transmitted while scanning L pieces of transmission directivity from the wireless transmitter, where k is a predetermined integer value and L is an integer that is equal to or greater than 2, wherein the measurement task measures a reception parameter relating to reception of a second signal that is transmitted at any one of the k pieces of transmission directivity from the wireless transmitter while the M pieces of reception directivity are scanned, and stores a second result of the measurement of the reception parameter in the memory, wherein the second result of the measurement includes both the second signal and the interference plus noise, and wherein the reception control task calculates a Signal to Interference plus Noise Ratio (SINR) of each of the M pieces of reception directivity based on a comparison between the first result of the measurement obtained in the first step and the second result of the measurement obtained in the second step, and determines a reception directivity having an SINR exceeding a prescribed value, among the M pieces of reception directivity, for use in data communication.

9. A directivity determination method in a wireless communication system in which a wireless transmitter and a wireless receiver are connected communicatively, the directivity determination method comprising:

in a first step, by the wireless receiver, measuring a reception parameter while scanning M pieces of reception directivity during an interval in which a signal is not transmitted from the wireless transmitter, where M is an integer that is equal to or greater than 2, and retaining a first result of the measurement which includes interference plus noise; and in a second step,
- by the wireless transmitter, transmitting a first signal to the wireless receiver while scanning L pieces of transmission directivity, where L is an integer that is equal to or greater than 2;
- by the wireless receiver, measuring a reception parameter relating to reception of the first signal that is transmitted at each of the L pieces of transmission directivity, determining k pieces of transmission directivity that correspond to high-ranking k results, respectively, of the measurements that have a great reception parameter, where k is a predetermined integer value <L, and reporting the determined k pieces of transmission directivity to the wireless transmitter;
- by the wireless transmitter, forming any one of the k pieces of transmission directivity and transmitting a second signal to the wireless receiver;
- by the wireless receiver, measuring a reception parameter relating to reception of the second signal that is transmitted by the wireless transmitter, while scanning the M pieces of reception directivity, and retaining a second result of the measurement which includes both the second signal and the interference plus noise; and calculating a Signal to Interference plus Noise Ratio (SINR) of each of the M pieces of reception directivity based on a comparison between the first result of the measurement obtained in the first step and the second result of the measurement obtained in the second step, and determining a reception directivity having an SINR exceeding a prescribed value, among the M pieces of reception directivity, for use in data communication.

* * * * *